United States Patent [19]

Depetris

[11] E Re. 29,071

[45] Reissued Dec. 14, 1976

[54] AUTOMATIC MACHINE FOR FEEDING AND SEWING SIGNATURES IN BOOKS

[75] Inventor: Lorenzo Depetris, Casale Monferrato (Alessandria), Italy

[73] Assignee: Smyth Europea S.p.A., Casale Monferrato (Alessandria), Italy

[22] Filed: Dec. 18, 1975

[21] Appl. No.: 642,212

Related U.S. Patent Documents

Reissue of:

[64] Patent No.: 3,797,419
Issued: Mar. 19, 1974
Appl. No.: 378,864
Filed: July 13, 1973

[30] Foreign Application Priority Data

July 18, 1972 Italy ..... 69329/72

[52] U.S. Cl. ..... 112/21
[51] Int. Cl.[2] ..... B42B 1/02
[58] Field of Search ..... 112/21, 22; 11/1 R, 11/1 CP

[56] References Cited

UNITED STATES PATENTS

| | | | |
|---|---|---|---|
| 3,024,746 | 3/1962 | Hildmann | 112/21 |
| 3,492,955 | 2/1970 | Gallagher | 112/21 |

FOREIGN PATENTS OR APPLICATIONS

| | | | |
|---|---|---|---|
| 589,476 | 11/1933 | Germany | 112/21 |
| 353,308 | 7/1931 | United Kingdom | 112/21 |
| 371,091 | 4/1932 | United Kingdom | 112/21 |
| 371,986 | 5/1932 | United Kingdom | 112/21 |
| 372,427 | 5/1932 | United Kingdom | 112/21 |
| 516,994 | 1/1940 | United Kingdom | 112/21 |
| 637,102 | 5/1950 | United Kingdom | 112/21 |

*Primary Examiner*—G. V. Larkin
*Attorney, Agent, or Firm*—Sughrue, Rothwell, Mion, Zinn & Macpeak

[57] ABSTRACT

A book sewing machine having an incorporated automatic feeder is disclosed. The automatic feeder has two stacks of signatures and acts to remove one signature from each stack simultaneously. The two signatures are both opened and then placed directly astride a sewing saddle of the sewing machine. The sewing saddle carries means for adjusting the spacing of the two signatures, and means for holding the two signatures in place as the sewing saddle moves to the sewing position where the two signatures are both sewn in one operation and then passed for further processing. One embodiment incorporates an automatic paster which applies paste to the signatures adjacent their backbones prior to placing them on the sewing saddle.

4 Claims, 13 Drawing Figures

AUTOMATIC MACHINE FOR FEEDING AND SEWING SIGNATURES IN BOOKS

Matter enclosed in heavy brackets [ ] appears in the original patent but forms no part of this reissue specification; matter printed in italics indicates the additions made by reissue.

The present invention relates to book sewing machines having means for automatically feeding and sewing signatures in books. Such machines comprise two main parts, a sewing machine part and an automatic feeder part, normally controlled by a programmer.

The sewing machine or sewer part includes means for perforating the backs of the signatures, means for joining the signatures to other signatures by sewing, means for pasting the backs of a group of sewn signatures, and automatic thread-cutting and discharge means for the completed books when sewn.

An essential part of the sewing machine part is the so-called saddle; this includes a fixed part or "fixed saddle" which is positioned laterally displaced from the zone in which the sewing is effected, and a movable saddle, the "sewing saddle," which moves reciprocally between a position in which it is aligned with the fixed saddle, and a position in which it is located adjacent the perforators and sewing devices of the sewing machine part. Signatures open in a suitable manner (selected according to the type of signature) are deposited from above onto the fixed saddle and are then moved by suitable transporters onto the movable saddle.

In known systems the feeder automatically picks up the signatures from a loader, opens them in the appropriate manner, and places them astride the fixed saddle, from where they are moved by the abovementioned transporters onto the movable saddle when this in the above mentioned position aligned with the fixed saddle. The automatic feeder generally also includes a programmer installation, which may be mechanical, electromechanical or electronic, which co-ordinates the various operations of the feeder.

This known system which represents an improvement over the previously used semi-automatic unit, in which the signatures were loaded onto the fixed saddle by hand, requires, as mentioned above, transporter devices for moving the signatures along the fixed saddle and onto the movable saddle. This, however, presents certain limitations, of which the most important is that it is not possible to make full use of the potential of the sewing machine part of the machine, especially where this is of the type suitable for sewing signatures the length of the back of which is relatively long.

Known transporters can only operate on one signature at a time so that the movable saddle can receive signatures only one at a time.

According to the present invention a book sewing machine having automatic means for transporting signatures from a stack thereof and sewing them into books, of the type comprising a feeder part for the signatures, the feeder having means for opening the signatures along their centre line and for moving them into a movable sewing saddle of a sewing machine part, the sewing saddle being reciprocably movable between a first position in which the top of the saddle is adjacent sewing devices of the sewing machine part, and a second position angularly displaced with respect to the first position, is characterised in that the movable saddle moves in a direction transverse the ridge of the saddle and the signature feeder part of the machine is so arranged with respect to the sewing machine part and is synchronised therewith in such a manner that the signatures are fed down from the feeder in an open position to be placed directly onto the movable saddle of the sewing machine part by the feeder part.

Preferably, the said feeder part is operative to place signatures onto the sewing saddle whilst the saddle is in the said second position thereof.

In a preferred embodiment of the invention the feeder comprises means for supporting two stacks of signatures, one each on respective sides of the median longitudinal plane of the machine, gripper means for simultaneously withdrawing a signature from each of the stacks and for transferring the two signatures to a conveyor means for opening the signatures, and means for placing both signatures simultaneously on to adjacent parts of the movable sewing saddle.

Various embodiments of the present invention will now be more particularly described, by way of example, with reference to the accompanying drawings, in which.

In all the figures corresponding elements have been assigned the same reference numerals.

Figure 1:
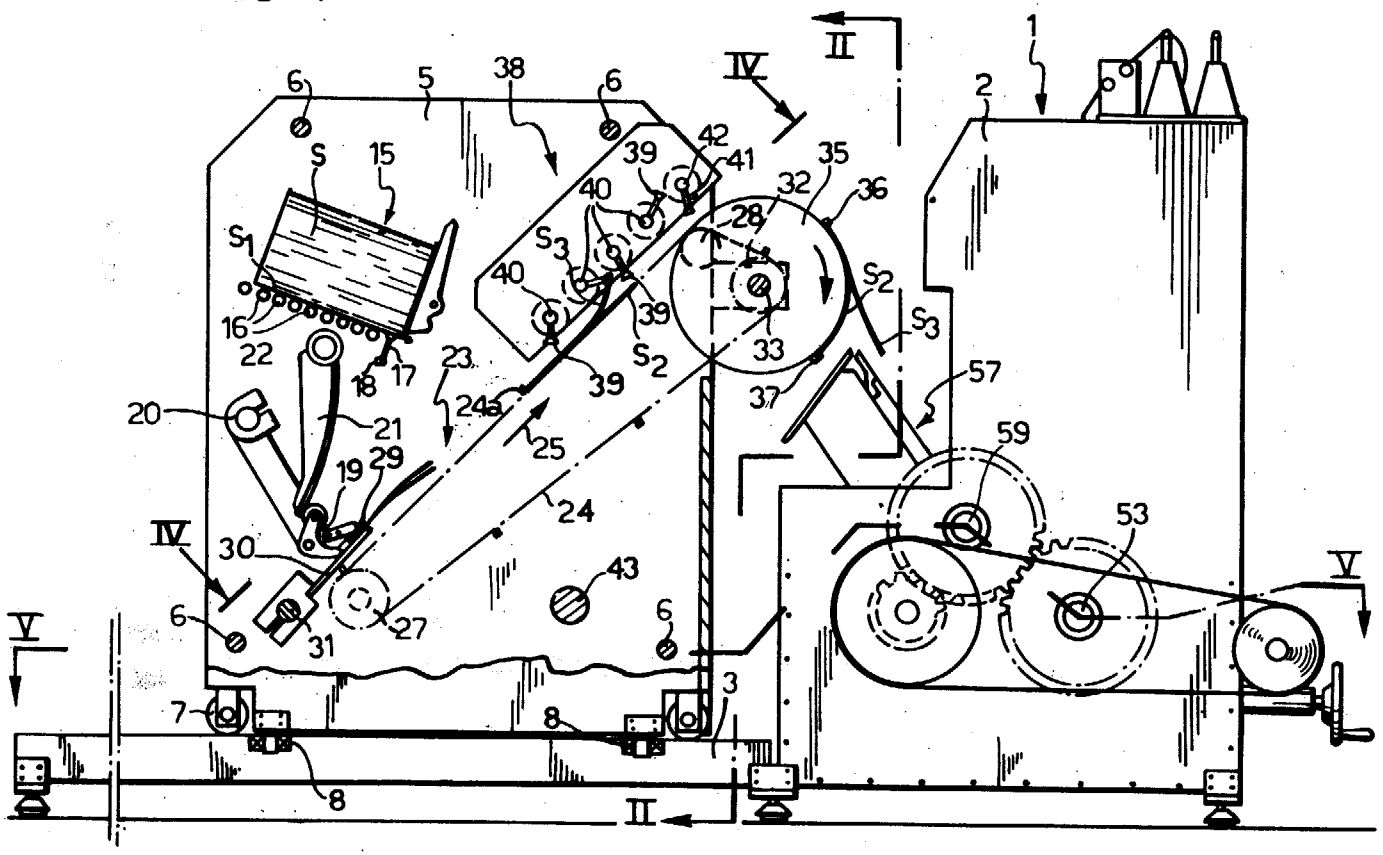
FIG. 1 is a partially sectioned side view of a book sewing machine formed as one embodiment of this invention.
Figure 2:
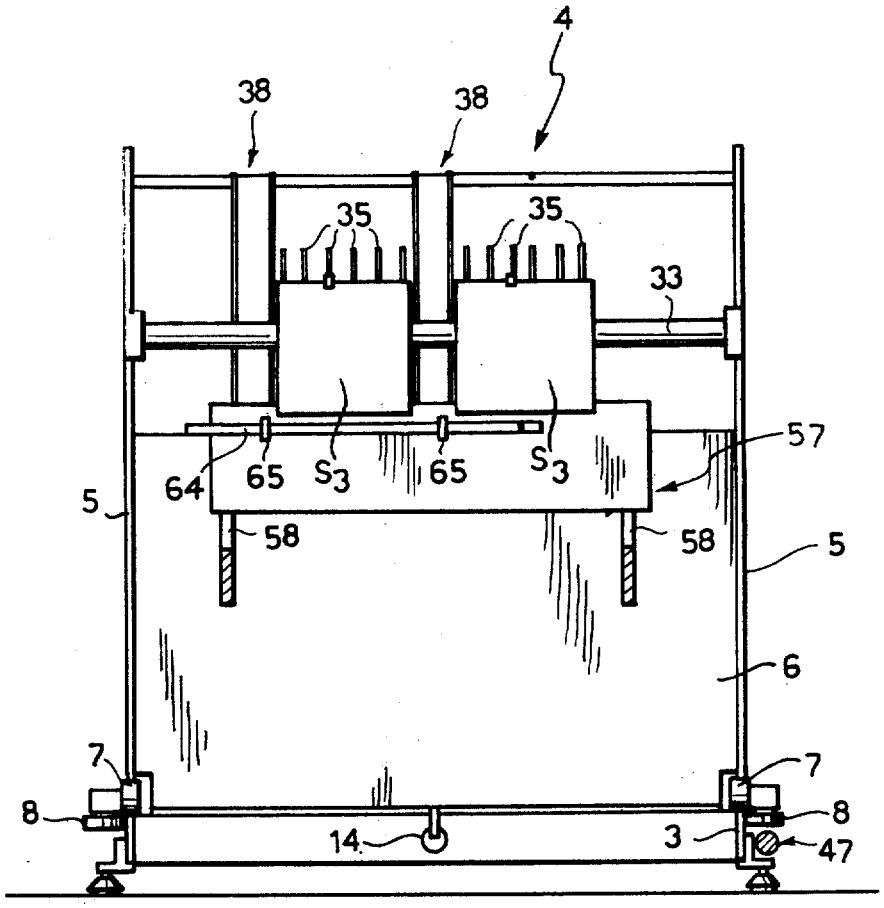
FIG. 2 is a sectional view of the embodiment of FIG. 1, taken on the line II—II of FIG. 1.

In the drawings, there is shown a sewing machine for books, generally indicated 1, the fixed framework of which includes side walls 2 parallel to and separated from each other. The walls 2 are connected by transverse elements 2a and carry beams 3 at the lower edges. The beams 3 act as guides for the signature feeder generally indicated by the reference numeral 4. The feeder 4 comprises a frame including two side walls 5 which are substantially coplanar with the walls 2 of the sewer 1 and connected together by transverse elements 6. The walls 5 of the feeder 4 are mounted upon rollers 7 having horizontal axes, which roll over the upper faces of the beams 3, and are also guided with respect to the beams 3 by rollers 8 having vertical axes, these also being carried by the walls 5.

Figure 3:
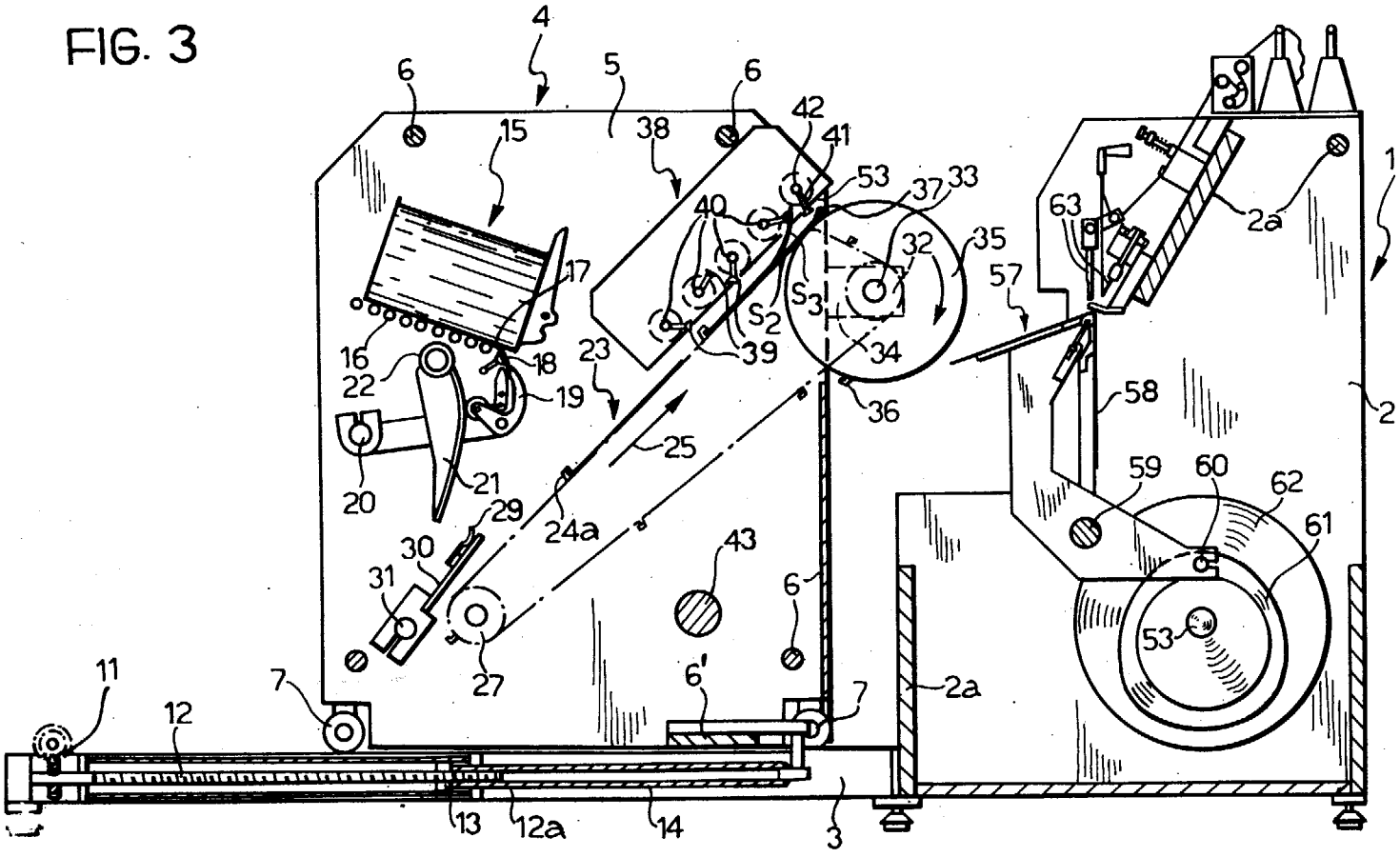
FIG. 3 is a longitudinal section showing the elements of the machine in a different operating position.
Figure 4:
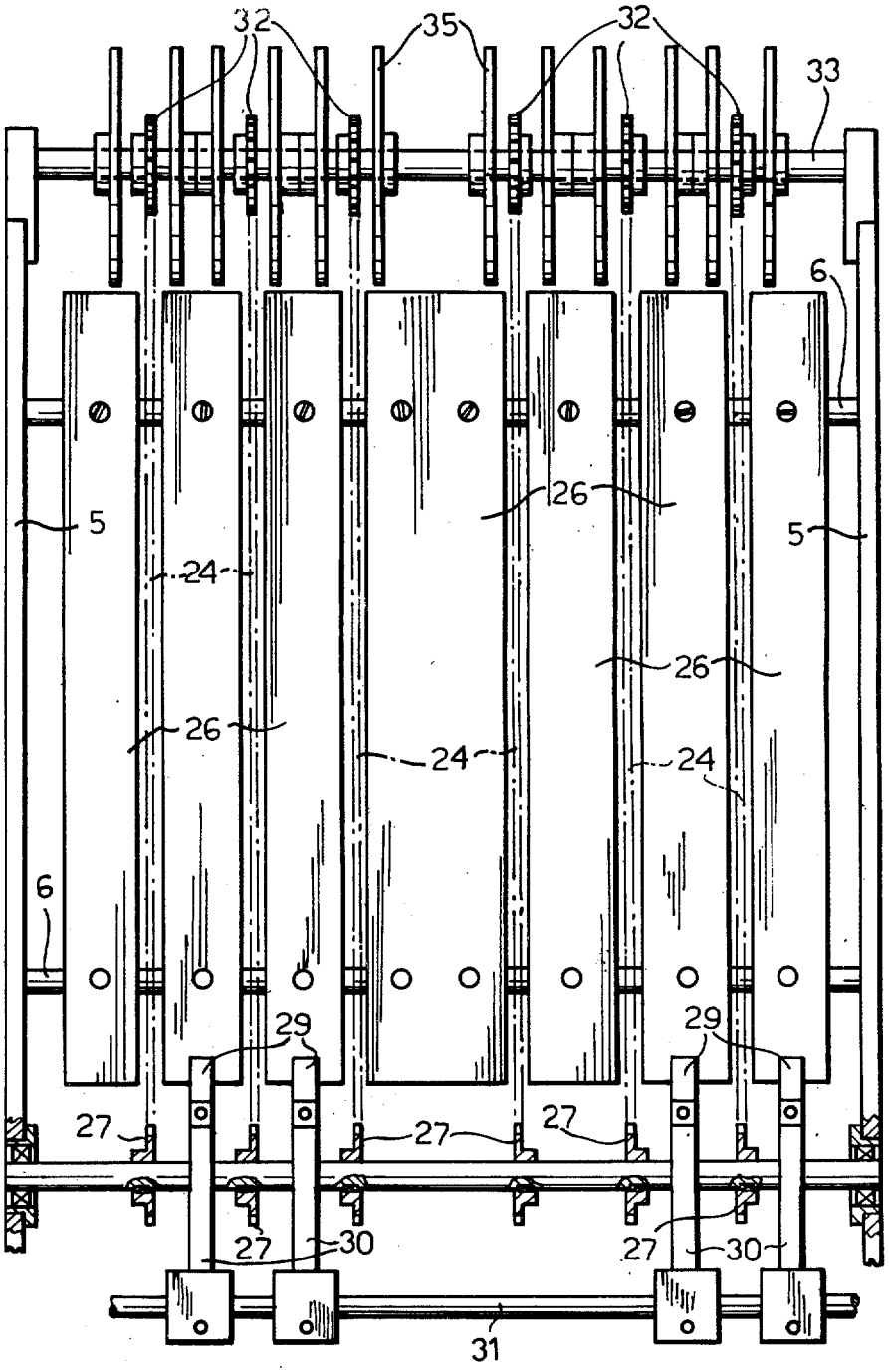
FIG. 4 is a sectional view of the embodiment taken on the line IV—IV of FIG. 1.
Figure 5:
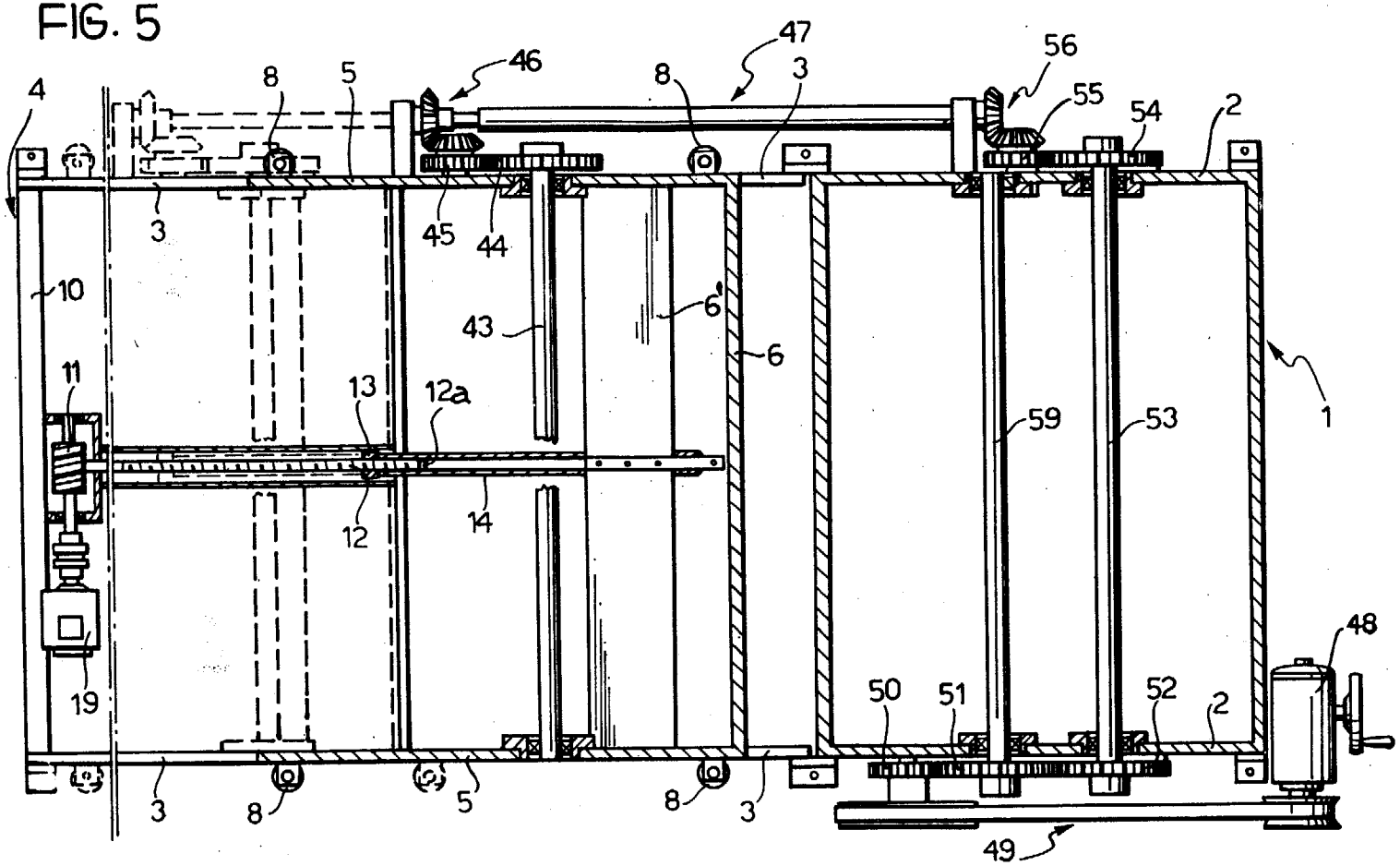
FIG. 5 is a sectional view of the embodiment taken on the line V—V of FIG. 1.

The beams 3 extend well beyond the feeder 4 when this is in a first position adjacent the sewer 1, in which position it is illustrated in FIGS. 1, 3 and 5. This is necessary to be able to move the feeder 4 away from the sewer 1 in order to gain access to those parts of the mechanism which are accessible only from the facing sides of these parts of the machine.

Movement of the feeder 4 can be effected by means of an electric motor 9 carried on a cross beam 10 which connects the longitudinal beams 3. The motor 9 drives a screw 12 via a worm and wheel reduction gear. The screw 12 is situated in the median longitudinal plane of the machine and is prevented from moving axially. A nut 13 carried in the end of a sleeve 14 engages the screw 12, and serves as a guide for the end 12a of the screw 12; the other end of the tube 14 is secured to a cross beam 6′ of the frame of the feeder 4. When the motor 9 rotates in one direction the feeder 4 is caused to approach the sewing machine 1, and when the motor 9 rotates in the opposite direction the feeder 4 moves away from the sewing machine 1.

The framework of the feeder carries two stacks 15 of signatures arranged in loaders between the two side walls 5, and adjacent the part which faces the sewing machine 1. The loaders are arranged with their backs to the sewing machine and on opposite sides of and spaced from the longitudinal median plane in which lies the screw 12. In each of the stacks 15 the backs of the lower signatures S1 (see FIG. 3) rest upon transverse rods 16 and can be folded downwards by a pair of suckers 17 carried by a transverse drilled shaft 18 which makes reciprocating partial revolutions of about 90° of arc in such manner as to move the suckers between the two extreme positions shown respectively in FIGS. 1 and 3. The purpose of this is to ensure that the signatures S1 may each be grasped by grippers 19 carried by an arm keyed to a shaft 20 parallel to the shaft 18, and associated with a cam 21 movement of which controls the closure and opening of the grippers 19. The cam 21 is keyed to a transverse shaft 22, which makes reciprocal partial rotations between the extreme positions shown in FIGS. 1 and 3, in synchronism with the shafts 18 and 20. All the shafts 18, 20 and 22 are carried by the walls 5 of the feeder 4. The grippers 19 transfer the signatures S1 from the stacks 15 onto a transporter generally indicated 23. The transporter 23 comprises a plurality of endless chains 24 which are moved continuously in the direction shown by the arrow 25. The chains have a plurality of small teeth 24a arranged in lines 26 transverse the chains. The grippers 19 do not deposit the signatures S1 directly upon the upper part of the transporter 23, but insert them first into spring clips 29 mounted at the end of arms 30 which are carried by a transverse shaft 13 which performs reciprocating partial rotations synchronised with those of the shafts 20 and 22. Thus when the arms 30 are raised (see FIG. 3) the spring clips 29 receive the signatures S1 which are drawn downwards by the grippers 19 which open as they deposit the signatures into the spring clips. The shaft 31 then rotates and the arms 30 move to deposit the signatures S1 onto the transporter 23 so that they are picked up by the small teeth 24a of the chains 24 as they pass the clip 29.

The chains 24 are driven continuously by toothed wheels 27 and cause rotation of gearwheels 32 keyed to a shaft 33 mounted rotatably in brackets 34 projecting from the edges of the walls 5 towards the sewing machine 1. To the shaft 33 is keyed a plurality of discs 35 which together form a transferring cylinder. The transferring cylinder has a pair of grippers 36 and 37. The grippers 36 serve to grasp the backs of the signatures and the grippers 37 grasp the leading edges of half S2 of the signatures S1 whilst these are leaving the upper part of the transporter 23, and moving substantially tangentially to the perimeter of the transferring cylinder.

Above the upper end of the transporter 23, adjacent the transferring cylinder, there are provided two leafing devices generally indicated 38, of a known type, each of which opens the signatures coming from one of the two stacks 15. These leafing devices each comprise four suckers 39 carried by respective horizontal shafts 40 perpendicular to the walls 5. The shafts 40 are driven with reciprocating partial rotations of about 90° and controlled by a programmer also of a type known in itself (not shown), which also controls the sucking action of the suckers 39 in dependence on the type of signatures which are to be dealt with.

Downstream from the suckers 39 in each leafing device there is a rod 41 carried by a shaft 42 parallel to the shafts 40. The shaft 42 is also driven with reciprocating partial rotations, and this operates to maintain temporarily raised the upper halves S3 of the signatures S1, to allow the grippers 37 of the transferring cylinder to grasp the leading edge of the lower halves S2 of the signatures S1. The grippers 36 are so arranged as to grasp the backs to the signatures S1 as these leave the transporter 23. The rotation of the transverse shafts which control the movable devices of the feeder is derived by known means (not shown) from a main driving shaft 43 which is driven from the sewing machine 1 (see FIG. 5) via toothed wheels 44, 45 and 46, and a telescopically extendable longitudinal shaft 47 parallel to the screw 12; all these are situated outside one of the side walls 5 of the feeder 4.

The sewing machine is controlled by a motor 48 which transmits rotation through a belt and pulley transmission 49 and toothed wheels 50, 51 and 52 are arranged adjacent the side wall of the sewing machine 1. The ends of the transverse shaft 53 of the wheel 52 are mounted rotatably in the side walls 2 of the sewing machine and one end of the shaft 53 projects out through one of the walls 2 and carries a toothed control wheel 54 which engages with a cooperating toothed wheel 55 which transmits rotation through a bevel gear 56, to the above mentioned telescopic shaft 47. The shaft 47 extends during withdrawal of the feeder 47 from the sewing machine 1 as illustrated by the line of dashes in FIG. 5.

The sewing machine 1 includes the so-called "movable saddle" 57 carried by two equal balancer arms 58 which are parallel to the walls 2 and mounted rotatably on a transverse shaft 59 which is pivoted in supports provided in the walls 2 and integral with the toothed wheel 51. The arms 58 are formed as double lever rocker arms and carry rollers (not shown) in pivots 60 (see FIG. 3) at the ends of the arms opposite those which carry the movable saddle 57. The rollers engage in cam channels 61 formed in opposed lateral faces of two discs 62 arranged between the arms 58 and the adjacent walls 2 of the sewing machine frame. The discs 62 are keyed to the shaft 53.

The cam channel 61 and the arms 58 are so shaped that the saddle 57 moves periodically between a sewing position (see FIG. 3) in which the top of the saddle is adjacent known sewing elements 63 which cooperate in a known manner with other sewing devices (not shown) carried by the movable saddle 57, and a loading position (see FIG. 1) in which the top of the saddle 57 lies substantially in a vertical plane which is tangential to the discs 35 of the transferring cylinder of the feeder 4. The shape of the cam channel 61 is, moreover, such that the saddle remains for a short time in each of the abovementioned positions so as to receive the signatures and to sew them to the books being made. The grippers 36, 37 of the transferring cylinder open to release the signatures held there-by when the backs of the signatures lie substantially in the vertical plane which is tangential to the discs 35 of the transfer cylinder.

The machine is also provided with means for ensuring that the signatures are correctly positioned and adequately set in place on the movable saddle 57 when this is stopped adjacent the sewing elements 63 of the sewing machine 1. This comprises a bar 64 parallel to the shaft 59 movable along guides in that face of the saddle adjacent the sewing machine, upon which the upper halves S3 of the signatures S1 are positioned. The bar 64 is housed in such a way that it does not project from this face of the saddle and carries two devices 65 spaced from one another by a distance equal to that which must separate during sewing the facing transverse edges of the two signatures which are simultaneously fed onto the saddle. One end of the bar 64 projects beyond the saddle 57 and is pivoted to a balancer lever 66 the pivot point of which is mounted to a pivot 67 carried by the saddle. The other end of the lever 66 carries a roller 68 which engages a face cam 69 in a disc 70 mounted for rotation with the shaft 59.

The arrangement is such that the bar 64 occupies a position with respect to the saddle 57, when the latter is ready to receive the signatures (see FIGS. 1 and 6) in which the devices 65 are displaced with respect to the position which they must occupy in order to ensure correct lateral adjustment of the signatures. The rotation of the shaft 59 during the period when the saddle dwells in the sewing position causes movement of the bar 64 and thus of the devices 65 (see FIG. 7) towards the arm 58 opposite to that adjacent which lies the disc 70, and thus causes the necessary lateral adjustment of the signatures for sewing.

Figure 6:
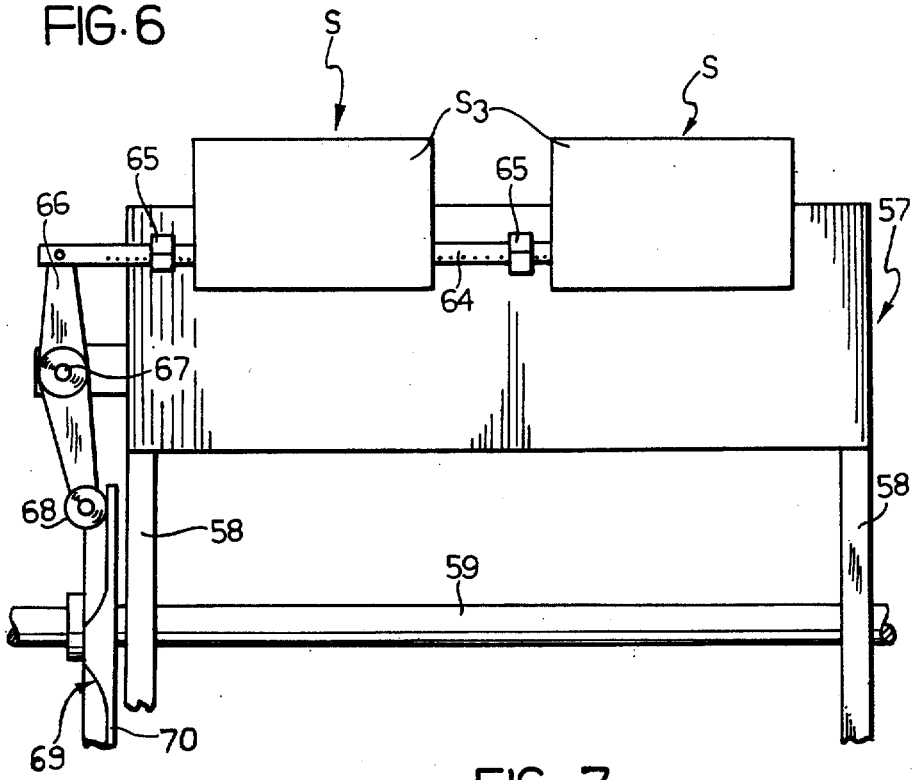
FIG. 6 is a view of a part of the machine showing the sewer part, the movable saddle and the devices for placing the signatures in lateral adjustment, in a first operating position.
Figure 7:
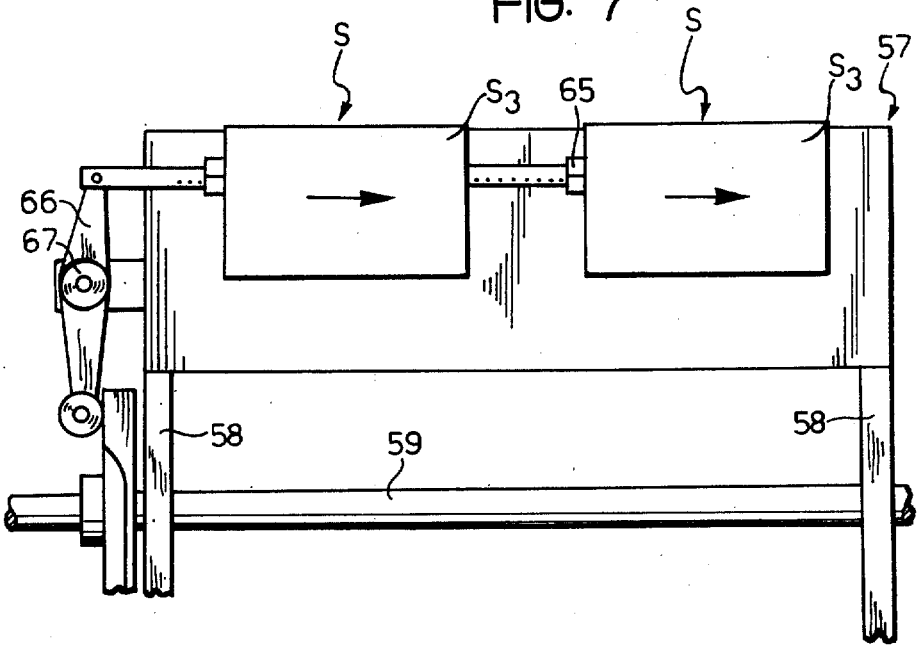
FIG. 7 is a view similar to FIG. 6 but showing the elements in a second operative position.

The positions of the loaders 15, the sewing devices 63, and the guides for the books already sewn (see FIG. 13), are so arranged that the lateral adjustment effected by the devices 65 as just described is sufficient to ensure correct location of the signatures for sewing; the return of the bar 64 to the position shown in FIG. 6 is ensured by the action of resilient biasing means (not shown).

Figure 8:
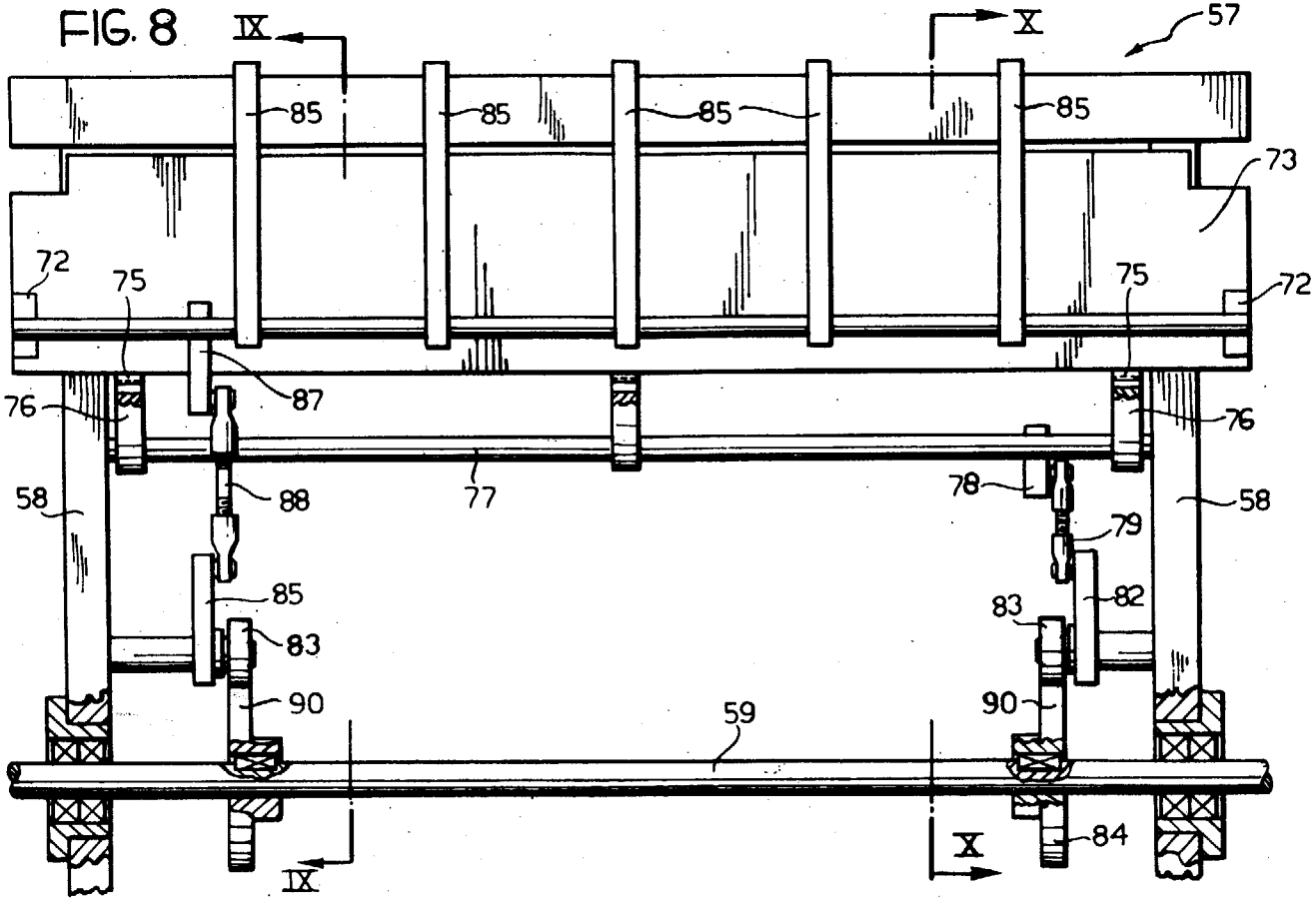
FIG. 8 is a view, from the feeder end of the machine, of the movable saddle of the sewer and of the respective devices for positioning the signatures and holding them in place on the sewing saddle.
Figure 9:
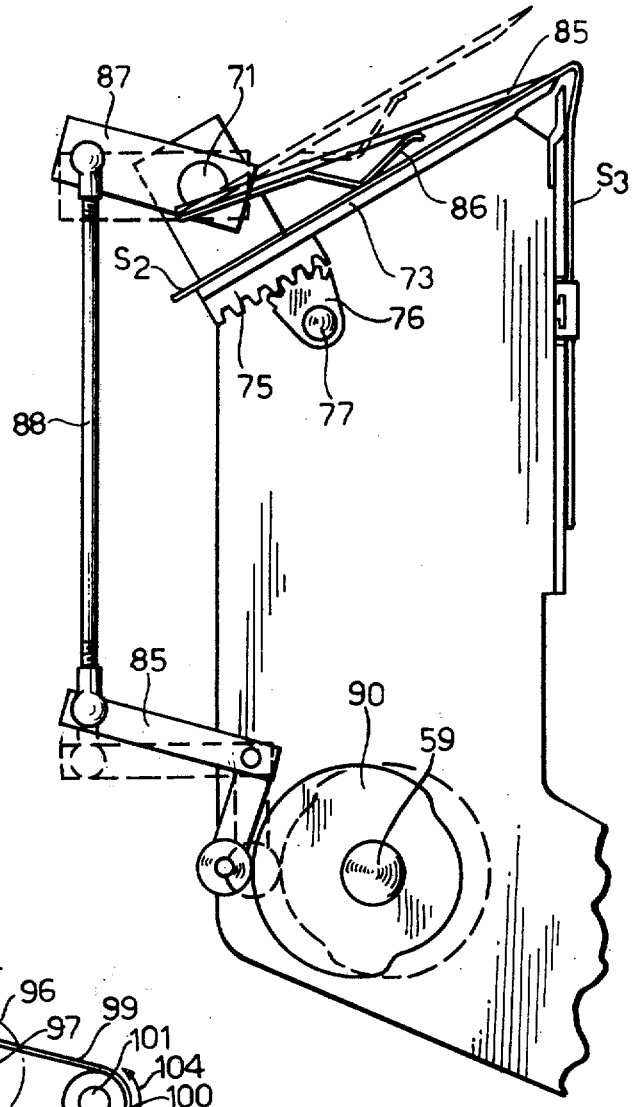
FIGS. 9 and 10 are sections taken on the line IX—IX and X—X of FIG. 8, respectively.
Figure 10:
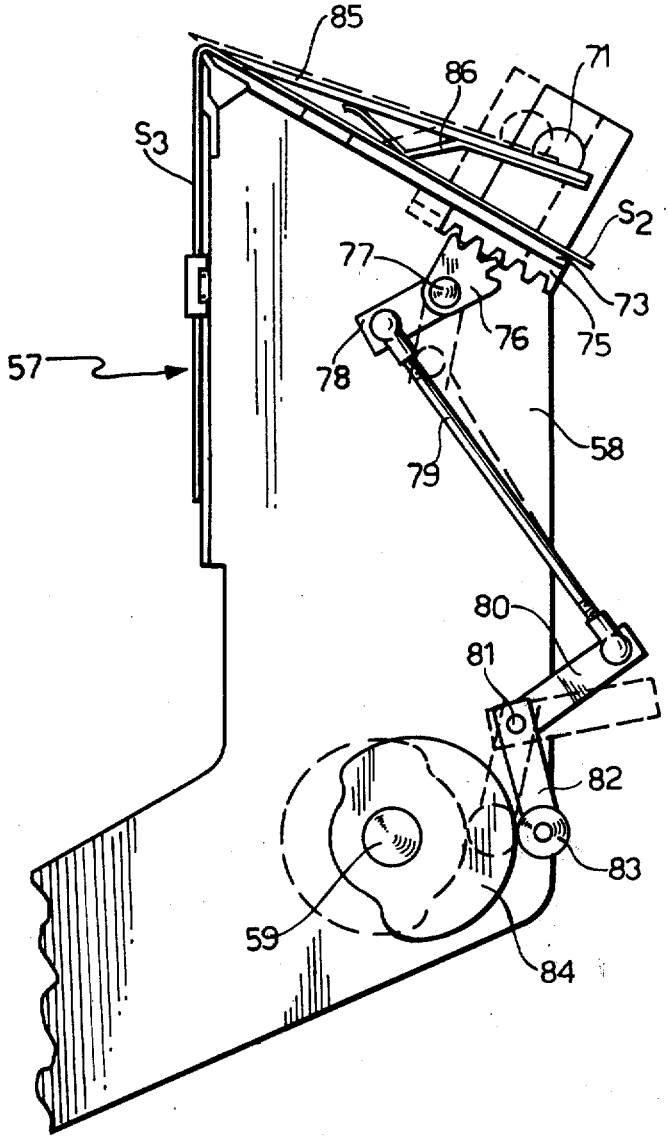

The saddle 57 is also provided with an arrangement for ensuring proper contact of the backs of the signatures to the opposite faces of the saddle 57. This arrangement, which comes into action during the movement of the saddle towards the sewing devices 63, comprise (see FIGS. 8 and 10) a shaft 71 parallel to the bar 64 and mounted rotatably in bearings 72 carried by a plate 73 which is covered by the upper half S2 of a signature S1 on the saddle, and mounted movably on the arms 58. To the plate 73 there are fixed racks 75 which engage toothed segments 76 carried by a shaft 77 parallel to the shaft 59 and mounted rotatably in the arms 58 carrying the saddle 57. One of the segments 76 is integrally formed with an arm 78 to which is pivoted one end of a draw-rod 79. The other end of the draw-rod 79 is pivoted to one arm 80 of a crank lever mounted upon a pivot 81 which is carried by one of the arms 58 supporting the saddle, and which is parallel to the shaft 59. The other arm 82 of the crank lever carries a roller 83 which is in contact with a cam 84 keyed to the shaft 59. A spring (not shown) ensures constant contact between the roller 83 and the periphery of the cam 84.

The shaft 71 carries a plurality of strips 85 connected at one end to the end of a limb of an associated V-spring 86 the apex of which faces the plate 73. The shaft 71 can be caused to rotate by means of a mechanism similar to that associated with the shaft 77 and comprising an arm 87, a draw-rod 88 and a crank lever 89 controlled by a cam 90 also keyed to the shaft 59. The arrangement of the parts is such that after the signatures have been laterally adjusted to strips 85 and their associated springs 86 press the lower halves S2 of the signatures S1 against the plate 73 of the movable saddle 57 and move them downwards on to the saddle as illustrated in broken outline in FIG. 10.

This operation terminates before the saddle reaches the sewing position, shown in FIG. 3, in which it dwells to enable sewing of the signatures to the books under formation to be completed.

Figure 12:
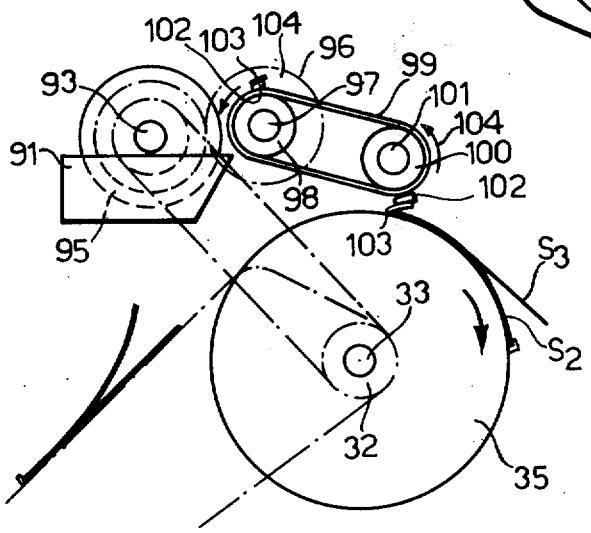
FIG. 12 is a diagrammatic side view of the feeder shown in FIG. 11.
Figure 11:
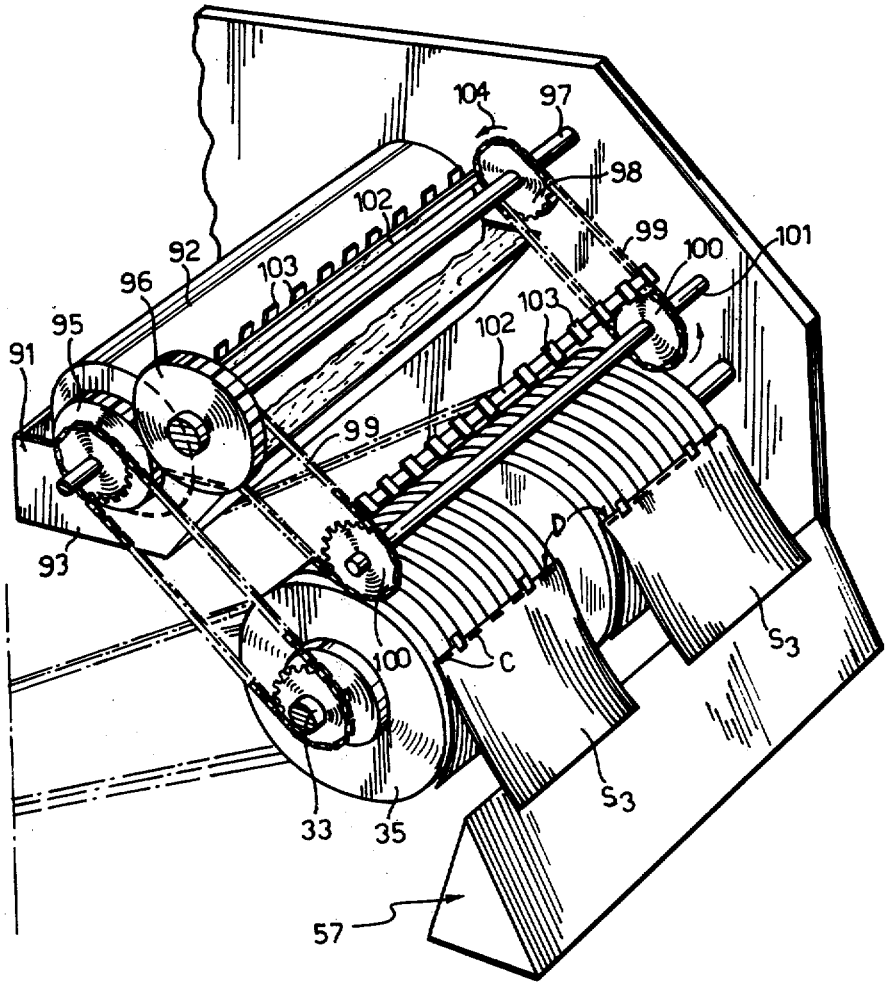
FIG. 11 is a perspective view of a detail of the feeder of a second embodiment of this invention.

In an alternative embodiment of this invention, shown in FIGS. 11 and 12, the feeder 4 is provided with an arrangement for applying strips of paste C in short sections to the external faces of the upper halves S3 of the signatures S1 adjacent the backs D thereof. For this purpose, adjacent the top of the transferring cylinder constituted by the discs 35 this is arranged a container 91 parallel to the shaft 33. The container 91 carries paste and is equipped with heating means (not shown).

Into the container 91 dips a roller 92 keyed to a shaft 93 and maintained in rotation by a transmission comprising a chain and sprockets 94 turned by the shaft 33. The shaft 33 also drives a gear pinion 95 which engages a gear pinion 96 mounted on a shaft 97 which is rotatable in openings in the walls 5. Adjacent each end of the shaft 97 are keyed two sprockets 98 which carry respective chains 99 which pass over sprockets 100 keyed to a shaft 101 parallel to the shaft 97 and also placed above the transfer cylinder formed by the discs 35.

The chains 99 carry a pair of bars 102 parallel to the shafts 97 and 101, and provided with spatulas 103 which, during the continuous circulation of the bars 102 in the direction of the arrow 104, engage against the periphery of the roller 92 and also against the signatures. The spatulas 103 thus pick up paste from the roller 92 and deposit it in the form of streaks close to the backs of the signatures S1 as they pass over the transfer cylinder.

The successive sewing of the signatures is thus accompanied by pasting of the signatures to the books being formed, thereby rendering superfluous the conventional pasting operation which is normally performed after the sewing of the book. This provides considerable simplification of the process for the formation of a book and also simplifies the equipment necessary to carry this into effect.

The operation of the machine described above will be clear to those skilled in the art from the above description.

Figure 13:
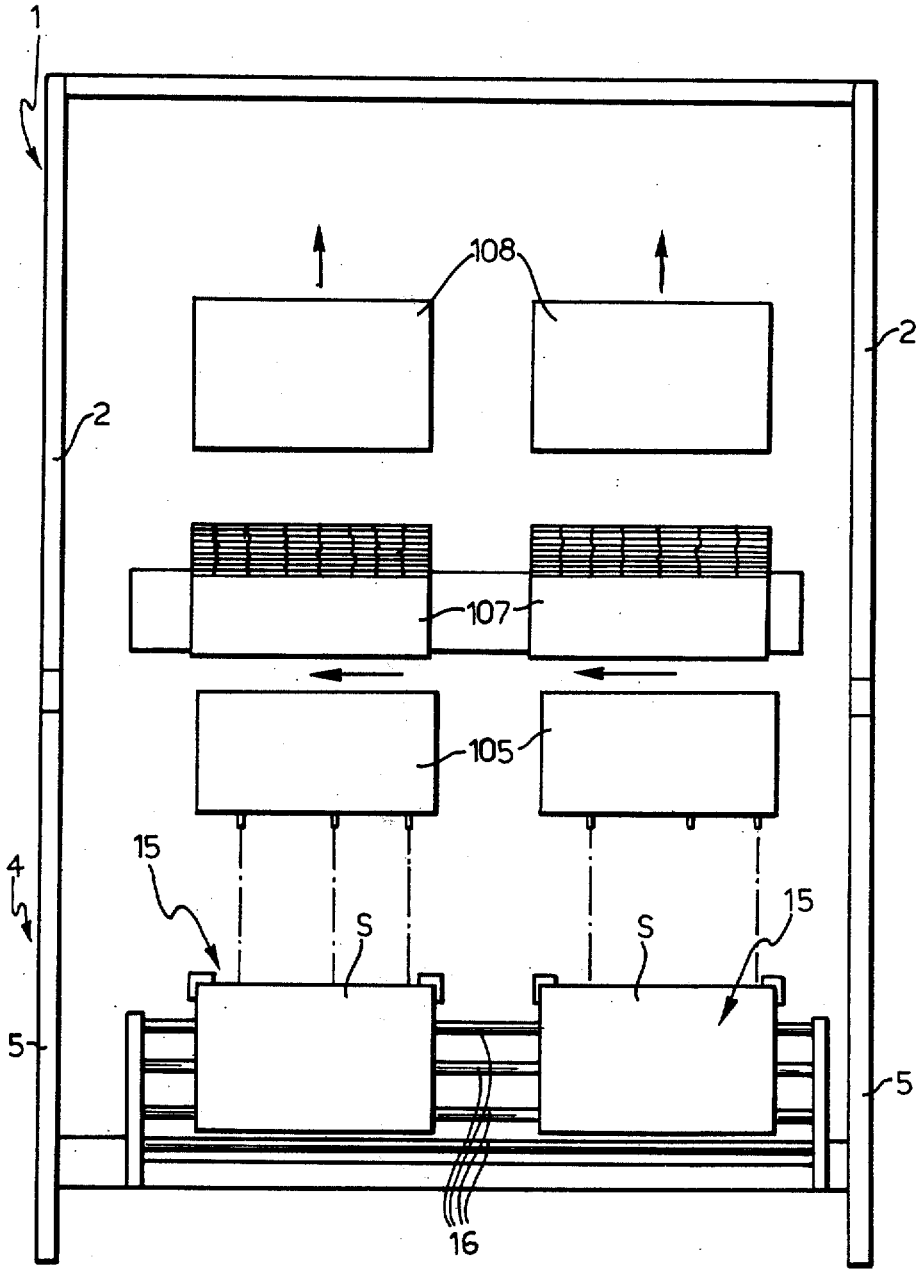
FIG. 13 is a diagrammatic plan view of the machine as a whole, showing the path taken by the signatures from a pair of stacks at the feeder end to the output from the machine.

FIG. 13 is a schematic diagram showing that the machine is capable of sewing two books at a time. In FIG. 13 signatures in the position which they adopt whilst they are open are indicated 105, and signatures in the positions in which they are sewn to the books being formed are indicated 106. Books emerging from the sewing machine are indicated 107 and 108.

I claim:

[1. In a book sewing machine of the type having:

a sewing machine part for sewing signatures to form a book, said sewing machine part including:

sewing devices, a sewing saddle, and means for moving said sewing saddle reciprocally between a first position adjacent said sewing devices and a second position remote from said sewing devices, and a feeder part including means for holding a stack of signatures to be sewn into books, means for removing said signatures from said stack thereof, means for opening said signatures along the line of the central backbone fold thereof, and conveyor means for transferring said signatures to said saddle, the improvement wherein:

said means for moving said sewing saddle operates to move said saddle in a direction transverse the ridge thereof onto which engages the central backbone fold of said signatures, said opening means operates on said signatures as they are moved along by said conveyor, said conveyor means operates to transfer said sewing saddle, and there are provided means for synchronising the movement of said feeder means with said reciprocating movement of said sewing saddle.]

[2. The book sewing machine of claim 1 wherein said synchronising means controls said feeder means to place said signatures onto said sewing saddle when said sewing saddle is in said second position.]

[3. The book sewing machine of claim 1 wherein said feeder part is mounted and adjacent said sewing machine part such that said conveyor faces directly on said sewing saddle.]

[4. The book sewing machine of claim 1 wherein said feeder part is mounted so as to be movable toward or away from said sewing machine part.]

[5. The book sewing machine of claim 4 wherein said sewing machine part has a framework including two substantially parallel horizontal guide beams, said feeder part being supported and guided by said beams.]

[6. The book sewing machine of claim 4 wherein said feeder part carries a motor having an associated transmission means connected to said sewing machine part to control said movement of said feeder part toward or away from said sewing machine part in dependence on the direction of rotation of said motor.]

[7. The book sewing machine of claim 1 wherein there is provided a single common motor driving both said feeder part and said sewing machine part.]

[8. The book sewing machine of claim 1 wherein there are provided:] *In a book sewing machine of the type having:*

*a sewing machine part for sewing signatures to form a book, said sewing machine part including:*

*sewing devices,*

*a sewing saddle, and*

*means for moving said sewing saddle reciprocally between a first position adjacent said sewing devices and a second position remote from said sewing devices, and a feeder part including*

*means for holding a stack of signatures to be sewn into books,*

*means for removing said signatures from said stack thereof,*

*means for opening said signatures along the line of the central backbone fold thereof, and*

*conveyor means for transferring said signatures to said saddle, the improvement wherein:*

*said means for moving said sewing saddle operates to move said saddle in a direction transverse the ridge thereof onto which engages the central backbone fold of said signatures,*

*said opening means operates on said signatures as they are moved along by said conveyor,*

*said conveyor means operates to transfer said sewing saddle, and there are provided means for synchronising the movement of said feeder means with said reciprocating movement of said sewing saddle,* two said means for supporting stacks of signatures on said feeder part, gripper means for withdrawing one signature from each of said stacks and for transferring said two signatures simultaneously onto said conveyor means, opening means for simultaneously opening both said signatures, and means for simultaneously placing said two opened signatures astride adjacent parts of said sewing saddle.

9. The book sewing machine of claim [1] 8 wherein there are further provided, adhesive applying means operating to apply an adhesive to one of the outer faces of said signature adjacent the backbone fold thereof, prior to placing said signatures onto said sewing saddle.

10. The book sewing machine of claim 8 wherein there are further provided, adjustment means on said sewing saddle, said adjustment means operating to adjust simultaneously the positions of said two signatures after they have been placed on said sewing saddle.

11. The book sewing machine of claim 10 wherein, there are further provided, holding means on said sewing saddle, said holding means operating after said adjustment means having adjusted the position of said two signatures on said sewing saddle to hold said signatures in position as said sewing saddle moves to said first position at which said signatures are sewn.

* * * * *